United States Patent Office 2,772,207
Patented Nov. 27, 1956

2,772,207

GLYCEROL MANUFACTURE

Edward M. Frankel, New York, N. Y., and Samuel L. Goldheim, Baltimore, Md.

No Drawing. Application November 9, 1953, Serial No. 391,112

13 Claims. (Cl. 195—38)

This invention relates to the purification of crude glycerol (glycerine); and in particular is directed to a novel method of accomplishing the same.

In the recovery of glycerol from by-product operations in the hydrolysis of fats and oils, and also in the manufacture of glycerol by the fermentation of carbohydrates, crude glycerol is obtained in a solution, either aqueous or non-aqueous, along with considerable quantities of inorganic salts. In the case of crude "soap-lye" glycerol, the inorganic salt is principally sodium chloride. In the case of crude fermentation glycerol the salt is mostly sodium sulphite. Numerous processes have been devised for separating the glycerol and the salts. Among such processes are: evaporation, salting out, distillation, solvent extraction, chemical precipitation and ion exchange. Although some of these methods have been resorted to in commercial operations directed toward the purification of crude glycerols containing sodium chloride, they are costly in operation and entail large expenditures for the equipment required to carry them into effect. Indeed, in the case of crude glycerols containing sodium sulphite, the aforementioned methods of purification are so costly as virtually to be impracticable.

In pondering over this important problem as to how glycerol and the inorganic salts might be separated, it occurred to us that a solution might be found in applying the concept of ion exclusion. In this process, the passage of solution containing a mixture of ionic and non-ionic solutes over a bed of resin, such as is used in ion exchange processes, there results a separation of the two components—the ionic solutes are "excluded" from the resin and hence appear first in the effluent from the bed of the resin, while the non-ionic solutes penetrate in varying amount into the resin, and hence appear later in the effluent from the bed of the resin. The result, therefore, is to effectuate a separation of the ionic and non-ionic components. Furthermore, the operation of washing these through the bed of the resin with pure solvent (usually water) regenerates the resin for reuse.

Although almost any ion-exchange resin will show this ion-exclusion effect, certain types of the resins appear to be particularly efficient. The polystyrene sulphonic acid type resin with about 8 percent cross-linkage with divinylbenzene (a product of the Dow Chemical Co. marketed under the trademark "Dowex" 50–x8), in 50–100 mesh size is especially efficient. The ion exclusion effect with such a resin is most marked when the resin is in the same ionic form as the ion to be excluded. Hence, if sodium chloride or sodium sulphite is to be excluded, the resin should be in the sodium form.

A fuller understanding of the method of carrying out the process of this invention will be apparent from the following example:

Example 1

310 ml. of "Dowex" 50–x8 (50–100 mesh) was placed in a glass column on a support of glass wool and a layer of sand. The internal diameter of the column was 46.5 mm., and the depth of the resin was 175 mm. The resin was backwashed from the bottom, and then treated downflow with 1,000 ml. of 10 percent aqueous sodium chloride solution. The column was then washed with 6,000 ml. of tap water, followed by a wash of 1,000 ml. of deionized water until the effluent no longer exhibited the presence of chloride ion when tested with silver nitrate. The column was then ready for operation. 50 grams of crude glycerol, made by the fermentation of sugar by yeast in the presence of sodium sulphite-bisulphite (analyzing 82.0 percent glycerol and 8.8 percent ash), was diluted with 50 g. of water; and passed through the column (downflow) at the rate of 10 ml. per minute. Then deionized water was poured on the column to wash out the glycerol completely.

Fractions were collected at the delivery of the column as follows:

| Fraction No. | 1 | 2 | 3 | 4 | 5 | 6 | 7 | 8 | 9 | 10 | 11 | 12 | 13 |
|---|---|---|---|---|---|---|---|---|---|---|---|---|---|
| Volume, ml. | 45 | 45 | 45 | 40 | 40 | 40 | 41 | 40 | 40 | 40 | 40 | 40 | 100 |
| Baume | 1 | 1 | 3 | 8 | 11 | 12 | 8 | 4 | 2 | 1 | 3 | 1 | 1 |

Fractions 1 to 6 inclusive were combined to provide 255 ml. of effluent which was then evaporated under vacuum (25 in.) to a residue of 39 g. Fractions 7 to 13 inclusive were combined to provide 341 ml. of an effluent which was then evaporated under vacuum (25 in.) to a residue of 71 g. Each of the two residues were then analyzed to ascertain their glycerol and ash contents. The results are summarized in the following table:

| | Weight (grams) | Glycerol | | Ash | |
|---|---|---|---|---|---|
| | | Percent | Grams | Percent | Grams |
| Input crude glycerol | 100 | 41.0 | 41.0 | 4.4 | 4.4 |
| Effluent fractions 1 to 6 | 39 | 61.0 | 23.8 | 9.8 | 3.8 |
| Effluent fractions 7 to 13 | 71 | 23.8 | 16.9 | 0.8 | 0.6 |
| Total Effluent | 110 | | 40.7 | | 4.4 |

Thus, starting with a ratio of glycerol to ash, in the crude material, of 9.3 to 1, two fractions were obtained with a glycerol to ash ratio of 6.3 to 1 in the first fraction; and 28.2 to 1 in the second fraction. It will be obvious that the ion exclusion technique provides an effective method for separating the non-ionic glycerol from the ionic salts present in the crude glycerols. In particular, this method provides an economical process for the purification of glycerol obtained from the fermentation of carbohydrates.

In a co-pending application for Letters Patent there is described another method of recovering glycerol from fermentation mixtures. In that application, the methods of fermenting carbohydrate to glycerol are described; and it is there shown that when a relatively pure form of fermentable sugar is used, the resulting mixture may be evaporated and the glycerol and salts separated from each other. When a less pure source of carbohydrate is used for the fermentation, the final mixture may require partial purification by one of the usual methods, as for example liquid-liquid extraction, etc., before carrying out the final stage of separating the glycerol and salts. In the case of the instant invention, it is possible to treat the fermentation mixture directly or a partially purified fermentation mixture in order to effectuate the separation of the glycerol and the salts.

In a preferred method of carrying out the present invention, a raw sugar containing over 90 percent of fermentable sugar as a 20 percent solution in water is fermented by yeast in the presence of sodium sulphite-bisulphite. The resulting final fermentation mixture is centrifuged to recover the yeast (which may be reused in subsequent fermentations); and the supernatant liquid is evaporated at atmospheric pressure to one-half volume at a pH of 9 to recover the ethanol and acetaldehyde. The residual concentrate consists essentially of glycerol and sodium sulphite. When this concentrate is passed through a bed of resin, such as "Dowex" 50-x8, the first fraction of the effluent contains some of the glycerol and practically all of the salts and any unfermented sugars. That first fraction may then be recycled to a subsequent fermentation thereby utilizing the sodium sulphite and the unfermented sugars over again. The second fraction of the effluent contains the remainder of the glycerol but is practically devoid of the sulphite. That recovered fraction of the glycerol may then be concentrated by evaporating off the water in any customary or conventional manner. The resulting concentrate thus produced is of sufficient purity for some commercial purposes. However, if it be desired further to purify the glycerol, the concentrate may then be treated by suitable methods such as distillation, chemical precipitation, or conventional ion exchange.

It will be apparent that the process above described provides a novel combination of steps to wit, fermenting a relatively pure sugar with yeast in the presence of sodium sulphite-bisulphite, evaporating the final mixture (thereby recovering the ethanol and acetaldehyde as byproducts), and then separating the evaporation residue into glycerol and sodium sulphite by passing the same over an ion exclusion resin. The higher cost of the relatively pure sugar, as contrasted with the cheaper impure forms of carbohydrate, is more than offset by the saving in cost of operation in carrying out the purification of the glycerol and the recycling of the sodium sulphite. This novel process not only makes it possible to save the sodium sulphite for reuse but it also provides means for avoiding a serious waste disposal problem. The glycerol recovered by this novel method is obtained in purity and good yield, and, because heating and exposure to acidity and alkalinity are avoided, the glycerol is of good quality.

When soap-lye glycerol (glycerol, salt and water) is treated by the ion exclusion process of this invention, the effluent from such process is denuded of almost all the salts. This provides a great advantage where the presence of the small amount of salt is not objectionable. If it is desired further to refine that effluent, such further refining can be carried out by conventional ion exchange processing or distillation.

It will be understood that the foregoing description of the invention is merely illustrative of the principles thereof; and, accordingly, that the appended claims are to be construed as defining the invention within the full spirit and scope thereof.

We claim:

1. Method of manufacturing glycerol by fermentation which comprises fermenting an aqueous sugar solution with yeast in the presence of sodium sulphite-bisulphite, separating the yeast cells from the fermented liquid, evaporating ethanol and acetaldehyde from the yeast-freed liquid to obtain a residual solution containing glycerol and sodium sulphite, passing said solution through a polar ion excluding material whereby the glycerol is retained in said ion excluding material and the sodium sulphite-bisulphite emerges with the effluent, and washing the aforesaid material thereby to obtain a solution of glycerol in high purity.

2. Method of manufacturing glycerol by fermentation which comprises fermenting an aqueous sugar solution with yeast in the presence of sodium sulphite-bisulphite, separating the yeast cells from the fermented liquid, evaporating ethanol and acetaldehyde from the yeast-freed liquid to obtain a residual solution containing glycerol and sodium sulphite, passing said solution through a polar ion excluding resin whereby the glycerol is retained in said ion excluding resin and the sodium sulphite-bisulphite emerges with the effluent, and washing the aforesaid resin thereby to obtain a solution of glycerol in high purity.

3. Method of manufacturing glycerol by fermentation which comprises fermenting an aqueous sugar solution with yeast in the presence of sodium sulphite-bisulphite, separating the yeast cells from the fermented liquid, evaporating ethanol and acetaldehyde as a pH of about 9 from the yeast-freed liquid to obtain a residual solution containing glycerol and sodium sulphite, passing said solution through a polar ion excluding material whereby the glycerol is retained in said ion excluding material and the sodium sulphite emerges with the effluent, and washing the aforesaid material thereby to obtain a solution of glycerol in high purity.

4. Method of manufacturing glycerol by fermentation which comprises fermenting an aqueous sugar solution with yeast in the presence of sodium sulphite-bisulphite, separating the yeast cells from the fermented liquid, evaporating ethanol and acetaldehyde at a pH of about 9 from the yeast-freed liquid to obtain a residual solution containing glycerol and sodium sulphite, passing said solution through a polar ion excluding resin whereby the glycerol is retained in said ion excluding resin and the sodium sulphite emerges with the effluent, and washing the aforesaid resin thereby to obtain a solution of glycerol in high purity.

5. Method of manufacturing glycerol by fermentation which comprises fermenting an aqueous sugar solution with yeast in the presence of sodium sulphite-bisulphite, separating the yeast cells from the fermented liquid, evaporating ethanol and acetaldehyde from the yeast-freed liquid to obtain a residual solution containing glycerol and sodium sulphite, passing said solution through a polystyrene sulphonic acid type resin with about 8 percent cross-linkage with divinylbenzene, the resin being in the sodium form, whereby the glycerol is retained in said resin and the sodium sulphite-bisulphite emerges with the effluent, and washing the aforesaid resin thereby to obtain a solution of glycerol in high purity.

6. Method of manufacturing glycerol by fermentation which comprises fermenting an aqueous sugar solution with yeast in the presence of sodium sulphite-bisulphite, separating the yeast cells from the fermented liquid, evaporating ethanol and acetaldehyde from the yeast-freed liquid to obtain a residual solution containing glycerol and sodium sulphite, passing said solution through a polystyrene sulphonic acid type resin with about 8 percent cross-linkage with divinylbenzene, the resin being in the sodium form, whereby the glycerol is retained in said resin and the sodium sulphite-bisulphite emerges with the effluent, and washing the aforesaid resin thereby to obtain a solution of glycerol in high purity.

7. Method of manufacturing glycerol by fermentation which comprises fermenting an aqueous sugar solution with yeast in the presence of sodium sulphite-bisulphite, separating the yeast cells from the fermentation liquid to obtain a clarified beer, passing said clarified beer through a polar ion excluding material whereby the glycerol is retained in said ion excluding material, and washing the aforesaid material to obtain a solution of glycerol in high purity.

8. Method in accordance with claim 7 wherein the ion excluding material is a polystyrene sulphonic acid type resin with about 8 percent cross-linkage with divinylbenzene, the resin being in the sodium form.

9. Method of manufacturing glycerol by fermentation which comprises fermenting an aqueous sugar solution with yeast in the presence of sodium sulphite-bisulphite, separating the yeast cells from the fermented liquid to obtain a clarified beer, and passing said beer through a polar ion excluding material whereby the glycerol is retained in said ion excluding material substantially as shown and described.

10. Method of purifying an aqueous solution of glycerol containing salts which comprise passing said solution through a polar ion excluding material whereby the glycerol is retained by said ion excluding material and the salts emerge with the effluent, and washing the aforesaid material thereby to obtain a solution of glycerol in high purity.

11. Method of purifying an aqueous solution of glycerol containing sodium sulphite-bisulphite which comprises passing said solution through a polystyrene sulphonic acid type resin with about 8 percent cross-linkage with divinylbenzene, the resin being in the sodium form, whereby the glycerol is retained in said resin and the sodium sulphite-bisulphite emerges with the effluent and washing the aforesaid resin, thereby to obtain a solution of glycerol in high purity.

12. Method of purifying an aqueous solution of glycerol containing sodium sulphite which comprises passing said solution through a polystyrene sulphonic acid type resin with about 8 percent cross-linkage with divinylbenzene, the resin being in the sodium form, whereby the glycerol is retained in said resin and the sodium sulphite emerges with the effluent and washing the aforesaid resin, thereby to obtain a solution of glycerol in high purity.

13. Method of purifying an aqueous solution of glycerol containing sodium bisulphite which comprises passing said solution through a polystyrene sulphonic acid type resin with about 8 percent cross-linkage with divinylbenzene, the resin being in the sodium form, whereby the glycerol is retained in said resin and the sodium bisulphite emerges with the effluent, and washing the aforesaid resin, thereby to obtain a solution of glycerol in high purity.

References Cited in the file of this patent

UNITED STATES PATENTS

| | | |
|---|---|---|
| 1,425,838 | Cocking | Aug. 15, 1922 |
| 2,410,518 | Neuberg | Nov. 5, 1946 |
| 2,615,924 | Reents | Oct. 28, 1952 |

OTHER REFERENCES

Rohm and Haas Co., Lab. Manual, Amberlite IR-45, Form 20R, I E-2-55, Revised, October 1952, pages 1 and 4